Nov. 15, 1949     C. PAGE     2,488,230
EGG-SEPARATING AND POSITIONING MACHINE
Original Filed Dec. 27, 1946
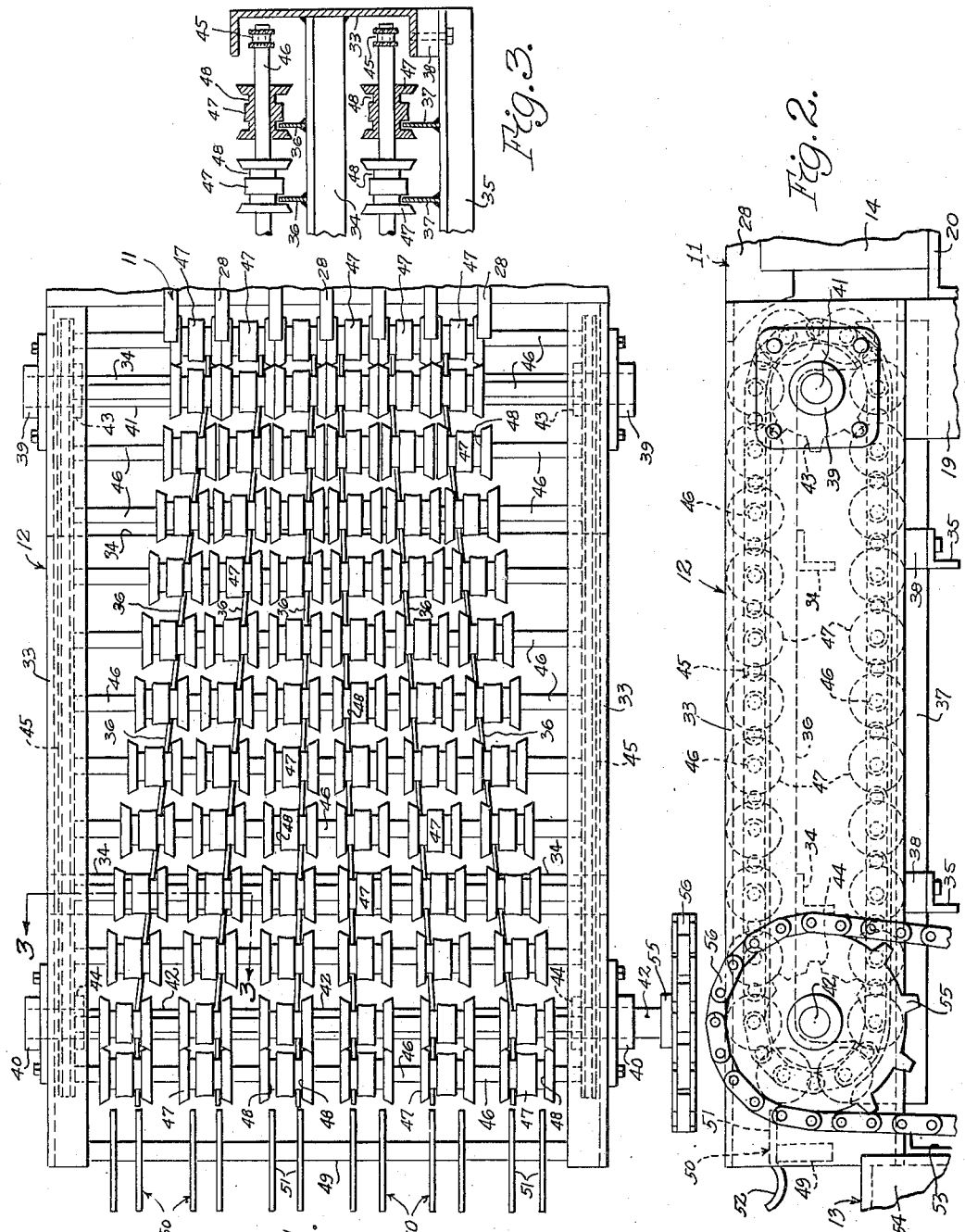
INVENTOR.
Clarence Page
BY Barthel & Bugbee
ATTYS Patented Nov. 15, 1949

2,488,230

UNITED STATES PATENT OFFICE 2,488,230

EGG-SEPARATING AND POSITIONING MACHINE

Clarence Page, Detroit, Mich., assignor to Page and Cox, Detroit, Mich., a corporation of Michigan Original application December 27, 1946, Serial No. 718,755. Divided and this application March 20, 1948, Serial No. 16,128

6 Claims. (Cl. 198—30)

This invention relates to egg-handling machinery, and in part to egg separating and positioning machines.

One object of this invention is to provide an egg-positioning machine wherein the eggs, after being separated from their containers, are turned until their long axes are horizontal and the eggs themselves are separated laterally into spaced rows.

Another object is to provide an egg separating and positioning machine upon which the eggs are placed and which conveys the eggs while turning them, until the eggs at the end of their travel upon the conveyor are positioned with their long axes horizontal, at which time they are deposited upon egg rests from which they are conveyed to egg-weighing machines or other egg-handling machines by other apparatus.

Another object is to provide an egg separating and positioning machine upon which the eggs are placed and which conveys them in diverging paths while rolling them around axes transverse to the direction of travel, until the eggs are deposited upon a row of transversely spaced egg rests with their long axes arranged horizontally and transversely to the direction of travel of the eggs. This is a division of my co-pending application Serial No. 718,755 filed December 27, 1946, now Patent No. 2,481,440, September 6, 1949, for Egg-grading machine.

In the drawings:

Figure 1 is a top plan view of an egg separating and positioning machine, according to a preferred form of the invention;

Figure 2 is a side elevation of the egg separating and positioning machine shown in Figure 1; and Figure 3 is a fragmentary transverse vertical section taken along the line 3—3 in Figure 1.

In general, the egg separating and positioning machine of the present invention, generally designated 12, is one unit of a multiple unit egg grading machine which includes two other units, namely an egg container removing machine, the left-hand end portion of which is shown at 11, and an egg sorting or weighing unit, the right hand end portion of which is shown at 13. The container removing machine 11 is disclosed and claimed in my co-pending application Serial No. 16,127, filed March 20, 1948, for Machine for removing eggs from containers, which is a division of my co-pending application above-referred to, whereas the egg sorting machine 13 is disclosed and claimed in the above identified co-pending parent application.

The container removing machine 11 pries the bottoms downward away from the upper portions of the containers as the containers are pushed forward toward the egg-positioning machine 12, so that when the containers arrive at the right hand end of the machine 12 (Figure 1) they are bottomless, the separated bottoms falling into a suitable receptacle. The upper portions of the containers are then lifted by the operator, leaving the eggs deposited upon the egg-positioning machine 12. This machine separates the eggs into rows which are spaced laterally from one another, and at the same time, rolls or turns the eggs until their long axes are transverse and horizontal. When the eggs, which at the same time are being conveyed by the egg-positioning machine 12, reach the left-hand end of the machine, they are deposited upon a row of individual egg rests. The eggs remain upon these egg rests only momentarily before being picked up and carried to the egg-weighing or sorting machine 13, which weighs them and separates them into groups of different predetermined weight ranges.

Referring to the drawings in detail, Figures 1 to 3 inclusive show the egg-positioning machine of this invention as connected to the egg container removing machine 11 at its right-hand end and to the egg sorting or weighing machine 13 (Figure 2) at its left hand end. The details of the egg-container removing machine 11 are fully disclosed in the above-mentioned divisional application and for the purposes of the present invention it is sufficient to say that the machine 11 includes an upright support 14 mounted on transverse angle brackets 20 which, in turn, are bolted to legs 19 which support the right hand end of the egg separating and positioning machine 12. Mounted upon the upright support 14 is a series of spaced parallel elongated stripping fingers 28, the forward ends (not shown) of which are pointed so as to pierce the egg containers at the junction of their bottoms and side portions and pry off the bottoms, leaving the eggs in the bottomless containers, resting upon the fingers 28. This is accomplished by pushing the egg container toward the fingers 28 and, after the bottoms have been separated, the operator continues to push the bottomless containers toward the egg separating and positioning machine 12. The fingers 28 are spaced apart laterally by amounts slightly less than the small diameter of an undersized egg.

The egg-positioning machine 12 includes a frame formed by a pair of vertical channel members 33 mounted on the upper ends of the legs 19 and with their channel portions facing one another. The channel members 33 are interconnected at intervals by upper and lower angle members 34 and 35 respectively (Figure 3) which in turn support upper and lower diverging guide rails 36 and 37 respectively. The lower flanges of the channel members 33 are separated from the lower angle members 35 by spacing members 38.

Bolted to the channel members 33 at their forward and rearward ends are pairs of aligned bearing bushings 39 and 40 respectively in which are journaled cross-shafts 41 and 42 respectively. Within the channels of the channel members 33 the shafts 41 and 42 near their opposite ends carry sprockets 43 and 44 respectively, these sprockets being encircled by endless chains 45.

Mounted between the endless chains 45 at intervals therealong are rods 46 carrying capstan-shaped rollers or spools 47 (Figure 3). The spools 47 are freely rotatable on the rods 46 and slidable axially therealong and are provided with annular grooves 48 near the ends thereof engageable with guide rails 36 and 37.

The channel members 33 at their left-hand ends are interconnected by a cross member 49 (Figure 2) which serves as a support for egg-rests 50. The egg-rests 50 consist of pairs of parallel rods 51 separated by gaps less than the small diameter of an undersized egg and having concavely bent portions 52 at their left-hand ends (Figure 2), their right-hand ends being positioned approximately in line with the groove 48 of the spools 47 at the left-hand end of the egg-separating portion 12. The channel members 33 at their left-hand ends (Figure 2) rest upon an angle member 53 which in turn is secured to an angle member 54 at the right-hand end of the egg-sorting unit 13. The left-hand or rearward shaft 42 carries a second sprocket 55 on the outer end thereof, this in turn being encircled by an endless driving chain 56 which at its lower end encircles a lower sprocket (not shown), which in turn is driven from a suitable power source.

In the operation of this invention, the eggs in their containers are placed upon the egg-container removing machine 11 and slid toward the pointed fingers 28, the ends of which wedge their way between the upper portions and bottoms of the egg-containers. This forces the bottoms downward and detaches them. The operator continues to push the bottomless containers and their eggs along the fingers 28 until these pass off the left-hand ends of the fingers 28 onto the rollers 47. Meanwhile, the chain 56 has been driven so as to rotate the shaft 42 and cause the spools or rollers 47 to move in orbital paths, carrying the eggs with them. As the rollers or spools 47 move along the upper course of the egg-separating and positioning machine or conveyor 12, the rollers 47 are caused to diverge (Figure 1) by reason of the engagement of the grooves 48 with the diverging guide rails 36. At the same time, the moving rollers or spools 47 pull the bottomless egg-containers forward until all of the eggs are deposited upon the rollers 47, whereupon the container may be lifted away from the eggs and discarded. In most instances, it is found that the motion of the spools or rollers 47 causes the bottomless egg-container to ride upward out of engagement with the eggs without the necessity of lifting it.

The eggs, thus freed from their containers, are moved to the left along the upper portion of the machine 12 and at the same time are rolled or turned by reason of their engagement with the capstan-shaped rollers 47, the latter being rotated by their engagement with the stationary guide rails 37. Thus, as the eggs near the left-hand end of the machine (Figure 1) they are shifted from their original vertical positions in the containers to horizontal positions with their long axes extending transversely of the machine. When the eggs reach the left-hand end of the machine, they are deposited by the spools or rollers 47 upon the egg-rests 50 and are momentarily held in the concavely-bent portions 52 thereof with their long axes still horizontal and extending transversely of the machine. The action of the machine therefor separates the eggs into spaced rows and places them in positions from which they are most conveniently picked up and carried to the weighing devices (not shown) which sort them into different predetermined weight ranges.

What I claim is:

1. An egg separating and positioning machine comprising a support, an endless conveyor on said support carrying a multiplicity of axially concave rollers arranged with their axes transverse to the direction of travel of said conveyor, said rollers being loosely mounted upon said conveyor and freely slidable axially in diverging paths relatively to said conveyor, and mechanism for driving said conveyor.

2. An egg separating and positioning machine comprising a support, an endless conveyor on said support carrying a multiplicity of axially concave rollers arranged with their axes transverse to the direction of travel of said conveyor, said rollers being slidable axially relatively to said conveyor, diverging guides engaging said rollers to effect axial sliding thereof during travel of said conveyor, and mechanism for driving said conveyor.

3. An egg separating and positioning machine comprising a support, an endless conveyor on said support carrying a multiplicity of axially concave rollers arranged with their axes transverse to the direction of travel of said conveyor, said rollers being slidable axially relatively to said conveyor, diverging guides engaging said rollers to effect axial sliding thereof transversely to the direction of travel of said conveyor and in response to the motion of said conveyor, and mechanism for driving said conveyor.

4. An egg separating and positioning machine comprising a support, a pair of endless conveyor elements arranged side by side thereon in spaced relationship, cross members interconnecting said conveyor elements at intervals therealong, a plurality of rollers mounted on each of said cross members, said rollers being loosely mounted upon said cross members and freely slidable axially in diverging paths along said cross members, and mechanism for driving said conveyor elements in synchronism.

5. An egg separating and positioning machine comprising a support, a pair of endless conveyor elements arranged side by side thereon in spaced relationship, cross members interconnecting said conveyor elements at intervals therealong, a plurality of rollers mounted on each of said cross members, said rollers being slidable axially along said cross members, diverging guides engaging said rollers to effect axial sliding thereof during travel of said conveyor elements, and mechanism for driving said conveyor elements in synchronism.

6. An egg separating and positioning machine comprising a support, a pair of endless conveyor elements arranged side by side thereon in spaced relationship, cross members interconnecting said conveyor elements at intervals therealong, a plurality of rollers mounted on each of said cross members, said rollers having annular grooves therein and being slidable axially along said cross members, diverging guides engaging said grooves to effect axial sliding thereof during travel of said conveyor elements, and mechanism for driving said conveyor elements in synchronism.

CLARENCE PAGE.

REFERENCES CITED

The following references are of record in the file of this patent:

UNITED STATES PATENTS

| Number | Name | Date |
|---|---|---|
| 626,284 | Lyons | June 6, 1899 |
| 1,284,031 | Ahlburg | Nov. 5, 1918 |
| 1,439,698 | Erdle | Dec. 26, 1922 |
| 2,296,645 | Marsden | Sept. 22, 1942 |

FOREIGN PATENTS

| Number | Country | Date |
|---|---|---|
| 603,097 | Germany | Sept. 22, 1934 |